No. 867,337. PATENTED OCT. 1, 1907.
C. D. BARNES.
BEEHIVE.
APPLICATION FILED MAR. 31, 1906.
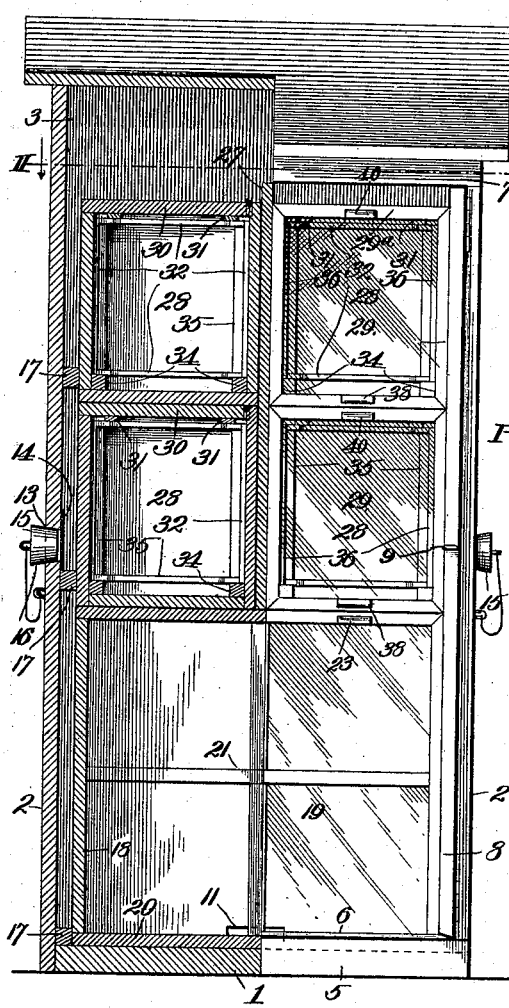
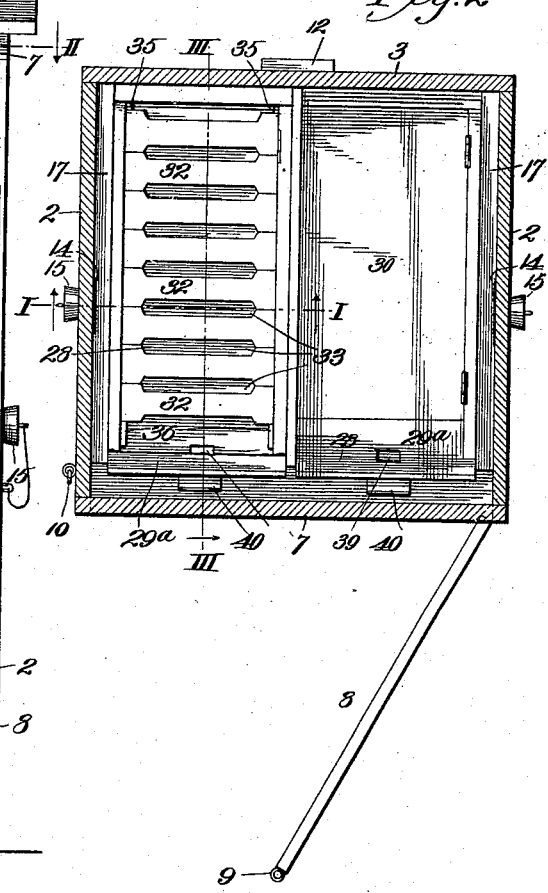
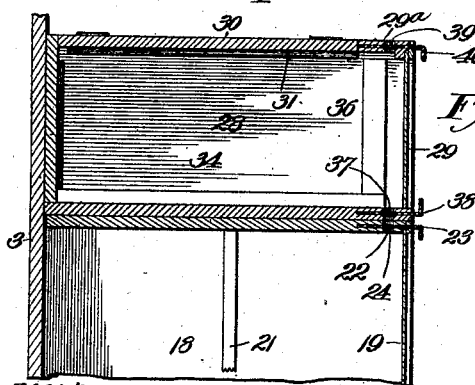
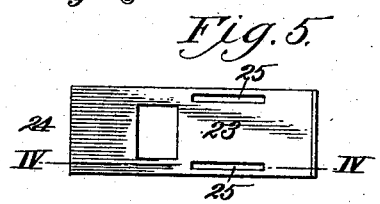
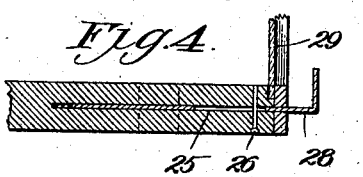
Witnesses:
H. C. Rodgers.
L. G. Evans
Inventor
Chas D. Barnes.
By George H. Thorp
atty.

UNITED STATES PATENT OFFICE.

CHARLES D. BARNES, OF KANSAS CITY, MISSOURI, ASSIGNOR OF ONE-THIRD TO J. E. CROOKS AND ONE-THIRD TO J. A. HANSON, OF KANSAS CITY, MISSOURI.

BEEHIVE.

No. 867,337.  Specification of Letters Patent.  Patented Oct. 1, 1907.

Application filed March 31, 1906. Serial No. 309,061.

*To all whom it may concern:*

Be it known that I, CHARLES D. BARNES, a citizen of the United States, residing at Kansas City, in the county of Jackson and State of Missouri, have invented certain new and useful Improvements in Beehives, of which the following is a specification.

My invention relates to beehives and more especially to that type from which the honey may be extracted with ease and convenience without the necessity of smoking the bees down to the bottom of the hive and without injury to the bees or the attendant.

A further object is to produce a beehive of simple, strong, durable and comparatively inexpensive construction.

With these general objects in view and others as hereinafter appear, the invention consists in certain novel and peculiar features of construction and organization as hereinafter appear, and in order that it may be fully understood reference is to be had to the accompanying drawing, in which—

Figure 1, is a view of a beehive embodying my invention, said figure being partly in elevation and partly in section on the line I—I of Fig. 2. Fig. 2, is a horizontal section taken on the line II—II of Fig. 1. Fig. 3, is a vertical section taken on the line III—III of Fig. 2, with the housing and honey sections omitted. Fig. 4, is an enlarged section of a portion of one of the sliding boxes, on the line IV—IV of Fig. 5. Fig. 5, is a plan view of one of the combined valve and handle plates.

In the said drawing, 1 indicates the bottom, 2 the side walls, and 3 the back wall and 4 the top of the housing, said top being pitched downward and forward by preference.

5 indicates a sill secured to the bottom and projecting above the same and having its upper edge pitched downward and outward as at 6, to prevent water from entering the housing.

7 indicates a cross piece or lintel connecting the side walls just below the top, and 8 a hinged door for closing the doorway or open front side of the housing between the door sill and the lintel, any suitable device such as an eye bolt 9 being fastened to the door and the hook 10 fastened to housing and adapted to engage said bolt when the door is closed, forming a means for securing the door in closed position.

11 indicates an opening in the lower edge of the back wall through which the bees may enter and leave the hive, and 12 a ledge contiguous to said opening, as a support for the bees preliminary to entering or when leaving the hive. The housing is provided with one or more openings 13 covered at the inner side by a fine screen or screens 14, to provide proper circulation of air within the housing. In cold weather these openings may be closed by plugs 15, secured to the housing by flexible connections 16, so as to prevent their misplacement when not employed in closing said opening or openings.

17 indicates cleats secured within the housing and secured to the side walls thereof and arranged between the lowest cleats is a box comprising side walls 18, and the transparent front wall 19. The back wall of the housing preferably forms the back wall of said box and the latter is shown with a bottom 20, though it is obvious that the bottom of the housing may form such bottom if desired. The interposition of the cleats provides air chambers between the box and the housing and erected within said box is a cross 21 whereon the queen bee may take her station, though of course this cross may be dispensed with.

The box described forms the home for the bees and is of capacity to hold sufficient honey for the support of the bees during the winter months.

22 indicates openings in the top and near the front edge of the box and intersecting said openings are slide plates or valves 23 having openings 24, and slots 25 engaging pins 26 to limit the movement of the slide plates or valves. In its normal or repressed position as shown, the openings 24 register with openings 22, and when desired the slide can be drawn forward so as to close said openings.

27 indicates a vertical partition in the housing above the box, and 28 slide boxes resting on the first-named box and held from lateral movement by the partition and the contiguous cleats 17. These slide boxes are preferably of the same depth from front to rear as the main box on which they rest and their front walls are of transparent material as at 29. The top wall of each slide box comprises a cross bar 29ª and a hinged door 30, and the latter is provided with a pair of longitudinal cleats 31 to press upon the series of "sections" 32 removably fitted in the box, said sections being of the usual type and each adapted to contain approximately one pound of honey. Each slide box as shown contains eight sections 32, though of course they may be adapted to contain a greater or less number, the sections having their upper and lower cross bars dished so as to form slots 33 through which the bees enter or leave the sections. The sections rest upon cleats 34 secured to the bottom of the slide boxes, these cleats and cleats 31 providing space which permits the bees to pass from one end of the slide boxes to the other under or upon the sections. The bottoms of the slide boxes are provided near their front ends with openings 37 controlled by slides 38, of precisely the same construction and arrangement as the slide plates 23.

Normally the slide plates or valves 38 are pushed in so as to leave unobstructed the openings 37 which register with openings 22, to permit the bee to pass from the lower box into either of the slide s desired there will be two or more tiers of these slide boxes, two tiers being shown. Where there are two tiers, the lower tier is provided in and near the front end of their top walls with openings 39 controlled by slide valves or plates 40, of the same type as the slide plates or valves 40 hereinbefore described so that the bees may pass from the lower tier of slide boxes into the upper tier.

The bees as usual charge the lower box with honey and the attendant can tell when the slide boxes are charged by opening the door 8, and looking through the transparent end wall of said box without danger of being stung by the bee or permitting them to escape because they are confined within the box in the housing. When one of the slide boxes is fully charged with honey, it can be readily withdrawn from the housing, but before doing so the slide or slides are drawn forward so as to close its openings, and the slide in the box below is also drawn forward so as to close the exit opening. If one of the boxes of the lower tier 26 is removed the superposed box is lowered to the position approximately occupied by the one removed. The hinged door of the removed slide box is then opened so as to permit the bees to escape and then the honey charged sections can be removed and new sections substituted therefor. The slide box is then placed upon the lower box and the slides restored to their original relation so that the bees may obtain access to the uncharged sections.

It will be apparent from the foregoing that the hive can be "robbed" at any time of the day or night without the slightest danger of the attendant being stung and without the necessity of smoking or otherwise stupefying the bees. It is furthermore apparent that the only point where moths and other insects can enter is the opening 11, which as usual will be guarded by the bees.

From the above description it will be apparent that I have produced a beehive embodying the features of advantage enumerated as desirable in the statement of the object of the invention and which is susceptible of modification in minor particulars without departing from the principle of construction involved.

Having thus described the invention what I claim as new and desire to secure by Letters Patent is:—

A beehive, comprising a housing provided with internal cleats, a door, a screen-covered opening, means to close the same, and an opening for the bees; a box within and on the bottom of the housing and between certain of said cleats and communicating with the bee opening and having its wall opposite said opening of transparent material, valve-controlled openings in the top wall of said box, a vertical partition upon the box, boxes fitting removably upon the first-named box at opposite sides of said partition and spaced from the side walls of the housing by certain of said cleats, and valve-controlled openings in the bottoms of said boxes.

In testimony whereof I affix my signature, in the presence of two witnesses.

CHARLES D. BARNES.

Witnesses:
G. Y. THORPE,
ALBERT TURNER.